United States Patent [19]

Simington

[11] 4,235,131
[45] Nov. 25, 1980

[54] DEPTH GAUGE GRINDING ATTACHMENT FOR SAW CHAIN SHARPENER

[75] Inventor: Jack F. Simington, Chiloquin, Oreg.

[73] Assignee: Simington Products Co., Chiloquin, Oreg.

[21] Appl. No.: 933,787

[22] Filed: Aug. 14, 1978

[51] Int. Cl.³ .............................................. B23D 63/16
[52] U.S. Cl. ........................................ 76/25 A; 76/42
[58] Field of Search .................... 76/25 A, 37, 40, 42, 76/74; 51/96

[56] References Cited

U.S. PATENT DOCUMENTS

| | | | |
|---|---|---|---|
| 2,833,166 | 5/1958 | Wilson et al. | 76/25 A |
| 3,006,222 | 10/1961 | McEwan | 76/25 A |
| 3,071,026 | 1/1963 | De Witt | 76/25 A |
| 3,089,351 | 5/1963 | Nyberg | 76/25 A |
| 3,349,645 | 10/1967 | Silvey | 76/40 |
| 3,592,085 | 7/1971 | Arneson | 76/25 A |
| 3,880,018 | 4/1975 | Simington | 76/25 A |
| 4,044,635 | 8/1977 | Simington | 76/25 H |

Primary Examiner—Othell M. Simpson
Assistant Examiner—Roscoe V. Parker
Attorney, Agent, or Firm—Clarence A. O'Brien; Harvey B. Jacobson

[57] ABSTRACT

A support plate is provided and includes a pair of intersecting adjacent side marginal edges disposed at generally 100° to 120° relative to each other and provided with endwise outwardly opening grooves formed therein communicated with each other at adjacent ends. The plate includes a transverse bore formed therethrough whereby the plate may be oscillatably supported from a swingable arm of a saw chain sharpener for movement of the plate toward and away from the rotary grinding wheel of the sharpener. Adjustment structure is supported from the plate for adjustably limiting angular displacement of the plate in one direction relative to the corresponding swing arm. The grooves formed in the plate are provided to guidingly and slidingly receive the guide lugs of an associated saw chain and the plate includes adjustable abutment structure engageable with successive saw chain teeth to limit shifting of an associated saw chain relative to the plate along the grooves.

3 Claims, 4 Drawing Figures

U.S. Patent   Nov. 25, 1980   Sheet 1 of 2   4,235,131
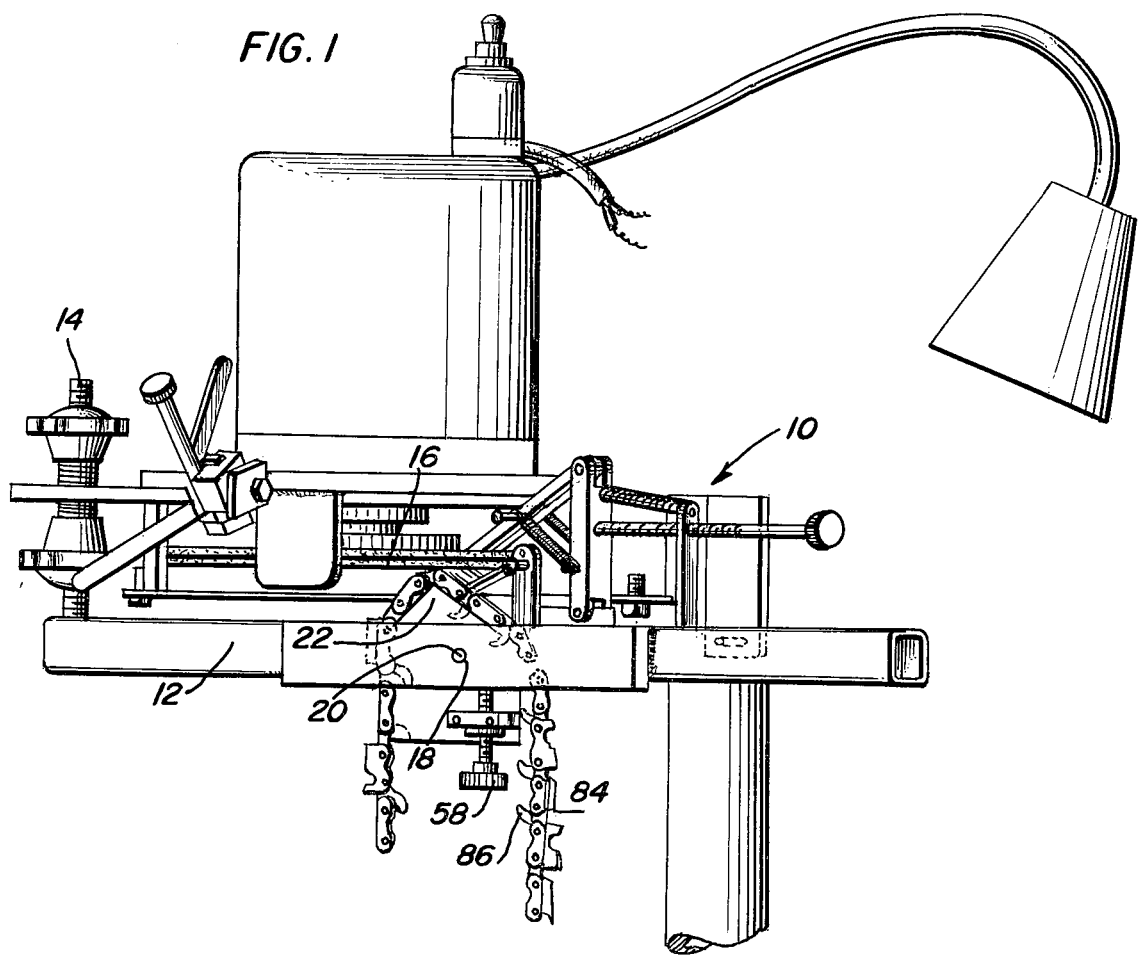
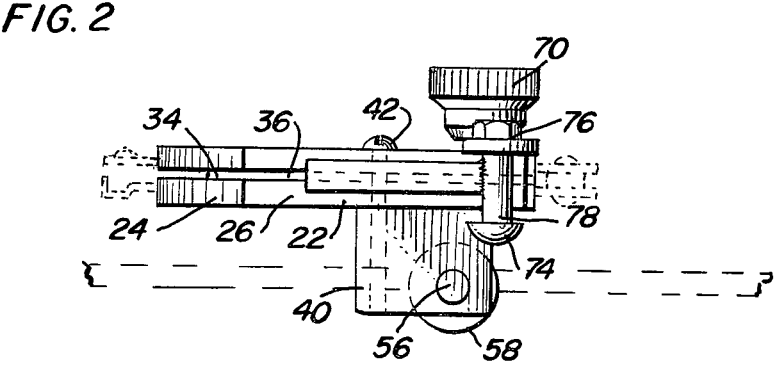

DEPTH GAUGE GRINDING ATTACHMENT FOR SAW CHAIN SHARPENER

BACKGROUND OF THE INVENTION

Various forms of saw chain sharpening devices have been heretofore provided such as those disclosed in U.S. Pat. Nos. 2,833,166, 3,006,222, 3,071,026, 3,349,645, 3,592,085, 3,880,018 and 4,044,635.

However, these saw chain sharpeners do not include structure whereby the depth gauges of saw chain teeth may be readily accurately ground. Accordingly, a need exists for an attachment which may be utilized in conjunction with a saw chain sharpener to also enable that sharpener to grind the depth gauges of saw chain teeth sharpened thereby.

BRIEF DESCRIPTION OF THE INVENTION

The depth gauge grinding attachment of the instant invention comprises a support plate including a pair of adjacent intersecting marginal edges disposed at generally 100° to 120° relative to each other and provided with endwise outwardly opening grooves formed therein communicated with each other at adjacent ends. The grooves are adopted to slidingly and guidingly receive the guide lugs of a saw chain and adjacent teeth of the saw chain may be positioned in engagement with adjacent portions of the aforementioned marginal edges, whereby the depth gauge of one of the teeth will be supported in fully exposed position for grinding by the grinding wheel of a saw chain sharpener. The support plate is adaptable for limited oscillatory support from a suitable supporting member of a saw chain sharpener whereby the plate may be moved toward and away from the rotary grinding wheel of the sharpener. Specifically, the support plate is designed to be removably supported from the support arm of the saw chain sharpener disclosed in U.S. Ser. No. 516,129 or U.S. Pat. No. 4,044,635.

The main object of this invention is to provide a depth gauge grinding attachment for use in conjunction with an apparatus specifically designed to sharpen the teeth of a saw chain with a rotary grinding wheel.

Another object of this invention is to provide a depth gauge grinding attachment which may be utilized in conjunction with different types of saw chains.

Yet another object of this invention is to provide a depth gauge grinding attachment constructed in a manner whereby it may be readily adjusted to compensate for saw chain teeth of different sizes.

Still another important object of this invention is to provide a depth gauge grinding attachment for use on a saw chain sharpener and which may be utilized by inexperienced persons.

A final object to of this invention to be specifically enumerated herein is to provide a depth gauge grinding attachment in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary side elevational view of a conventional form of saw chain sharpener and with the depth gauge grinding attachment of the instant invention operatively supported from the swing arm of the saw chain sharpener;

FIG. 2 is a top plan view of the depth gauge grinding attachment on somewhat of an enlarged scale;

DETAILED DESCRIPTION OF THE INVENTION

Figure 3:
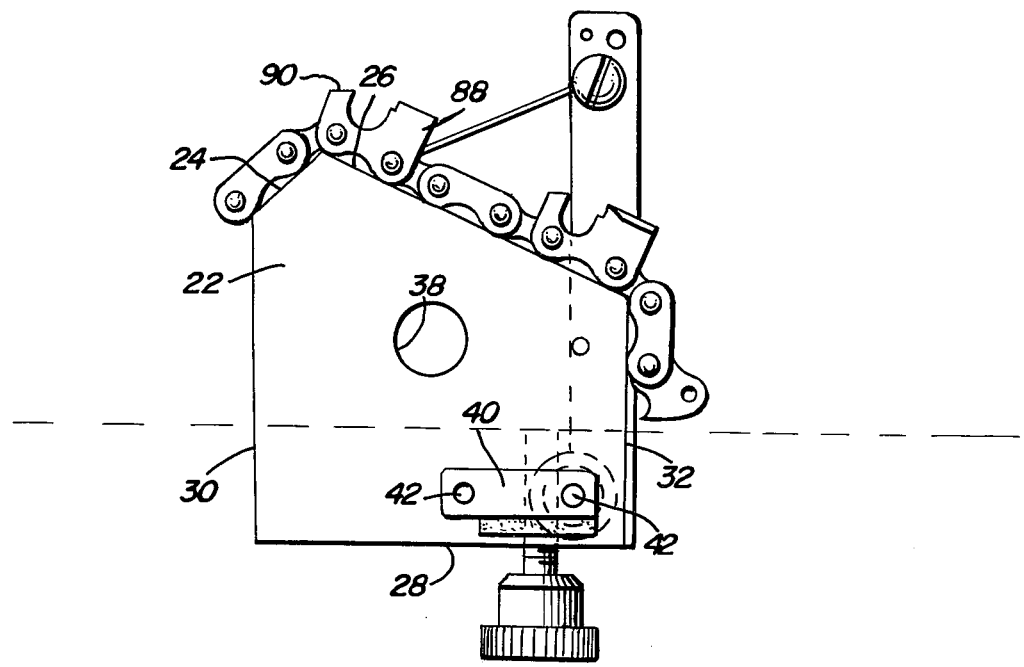
FIG. 3 is a side elevational view of the depth gauge grinding attachment.
Figure 4:
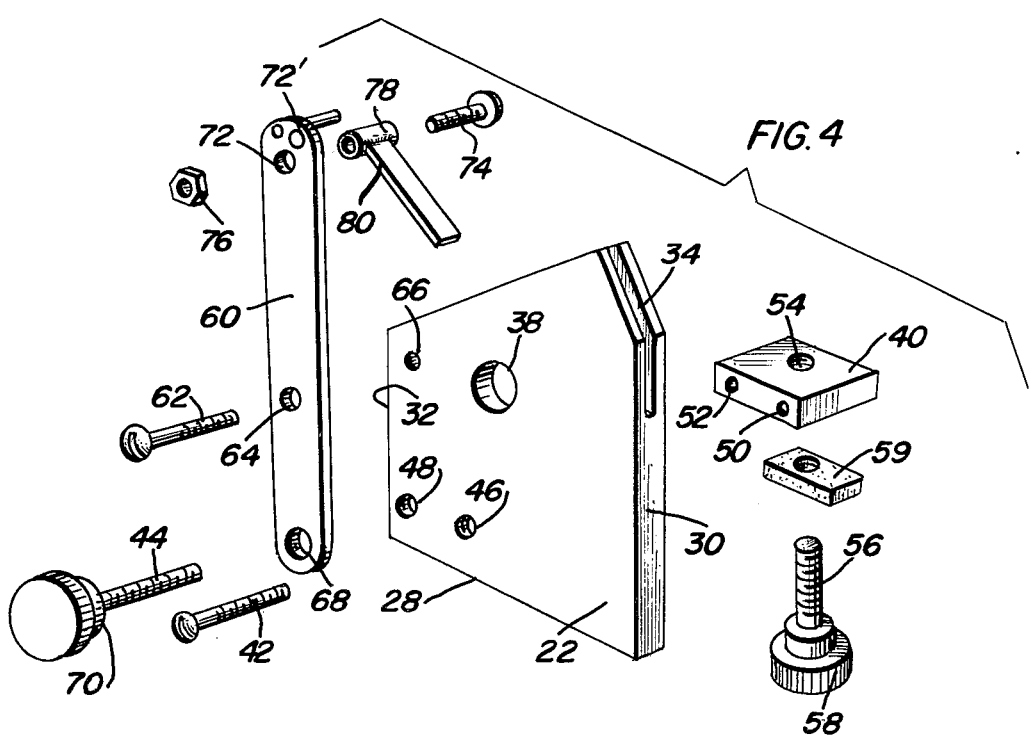
FIG. 4 is an exploded perspective view of the depth gauge grinding attachment.

Referring now more specifically to the drawings, the numeral 10 generally designates a conventional form of saw chain sharpener such as that disclosed in either U.S. Ser. No. 516,129 or U.S. Pat. No. 4,044,635.

The sharpener 10 includes an oscillatable support arm 12 swingable about an upstanding axis 14 between positions with the longitudinal midportion of the support arm 12 disposed on opposite sides of a powered rotary grinding wheel 16.

The midportion of the support arm 12 includes a transverse threaded bore 18 in which a pivot fastener 20 is removably threadedly engaged. The pivot fastener 20 conventionally supports a peripherally grooved circular disk over which a saw chain to be sharpened can be draped and the saw chain may have successive teeth thereof brought into correct position relative to the grinding wheel 16 for sharpening thereby.

The attachment of the instant invention is referred to in general by the reference numeral 22 and comprises a flat metallic plate including a pair of relatively angulated upper marginal edges 24 and 26, a lower marginal edge 28 and a pair of upstanding edges 30 and 32 extending between remote ends of the edges 24 and 26 and the opposite ends of the edge 28. The edges 24 and 26 have coextensive grooves 34 and 36 formed therein with the adjacent ends of the grooves 34 and 36 opening into each other and the remote ends of the grooves opening outwardly through the edges 30 and 32.

The plate 22 has a central opening 38 formed therethrough in which an enlargement (not shown) on the pivot fastener 20 is snugly receivable whereby the plate 22 may be oscillatably supported from the support arm 12 by means of the pivot fastener 20. The pivot fastener 20 includes a diametrically enlarged head (not shown) and may be tightened against the plate 22 in order to clamp the latter in position on the support arm 12.

A support block 40 is secured to one side of the plate 22 by means of fasteners 42 and 44 secured through bores 46 and 48 formed in the plate 22 and threadedly engaged in bores 50 and 52 in the block 40. The block 40 includes an upstanding threaded bore 54 formed therethrough and an abutment screw 56 is threaded upwardly through the bore 54 and includes a diametrically enlarged head 58 on its lower end, a friction block 59 being also threaded on the screw 56 below and jammed against the support block 40 above the head 58.

An elongated lever 60 is pivotally supported from the side of the plate 22 remote from the support block 40 by means of a pivot fastener 62 passed through a transverse bore formed in the lever 60 intermediate its opposite ends and threadedly engaged in a threaded bore 66 formed transversely through the plate 22. In addition, the lower end of the lever 60 includes an enlarged bore 68 formed therethrough and it is to be noted that the fastener 44 is loosely received through the bore 68 and thereby establishes limits of oscillation of the lever 60 relative to the plate 22. The fastener 44 includes a diametrically enlarged head 70 and may thus be utilized to clamp the lever 60 in predetermined angularly displaced position relative to the plate 22.

The upper end of the lever 60 includes a pair of bores 72 and 72' formed therethrough and a threaded fastener 74 is secured through the bore 72 by means of a threaded nut 76 and has a sleeve 78 disposed thereon. One end of an abutment arm 80 is supported from the sleeve 78 and the free end of the abutment arm 80 is adapted to engage successive cutting teeth of a saw chain. The fastener may, alternately, be secured through the bore 72' to vary the effective length of the arm 80.

In operation, the attachment or plate 22 is removably supported from the midportion of the arm 12 by means of the fastener 20 and may be angularly displaced about the fastener 20 relative to the arm 12. However, the abutment screw 56 may be adjusted relative to the block 40 in order to limit oscillation of the plate 22 in one direction relative to the arm 12, the abutment screw 56 engaging the underside of the arm 12. A saw chain section 84 may be draped over the plate 22 with the guide lugs 86 of the section 84 disposed over the plate 22 snugly and slidingly received in the grooves 34 and 36. After the lever 60 has been properly adjusted, the free end of the abutment arm 80 may be engaged with one of the cutting teeth 88 in the manner illustrated in FIG. 3 of the drawings and in this manner the depth gauge 90 of that cutting tooth 88 is supported in elevated position relative to the uppermost portion of the plate 22 for engagement with the rotary grinding wheel 16 and all other portions of the saw chain section 84 depressed below the depth gauge 90. When the depth gauge 90 has been thus positioned, the support arm 12 may be swung toward the rotary grinding wheel 16 in order that the depth gauge 90 will be ground with a bevel thereon. Thereafter, successive teeth 88 of the chain section 84 may have their depth gauges 90 ground in the same manner. Thus, after the sharpener 10 has been utilized to equally sharpen all of the teeth 88 of the chain section 84, the attachment 22 may be utilized in grinding all of the depth gauges 90 of the section 84, thereby fully renewing the cutting efficiency of the saw chain section 84.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. In combination with a grinding wheel rotatable about an upstanding axis and having an exposed underside portion, a mount portion swingable in a horizontal plane spaced slightly below said grinding wheel, a support carried by said mount portion and defining a pair of upwardly convergent relatively angulated surfaces oppositely inclined relative to the horizontal, said surfaces having coextensive grooves formed therein extending therealong and opening into each other at adjacent ends, said surfaces being adapted to have a saw chain section draped thereover with the guide lugs of said chain section guidingly and slidingly received in said grooves and with the adjacent side links of said chain section abutting said surfaces on opposite sides of said grooves, said relatively angularly disposed surfaces comprising means for supporting adjacent chain section portions therefrom with the guide lugs of said chain section portions disposed in said grooves and one selected tooth link of said chain section supported from one of said surfaces with the other depth gauge end of said tooth link adjacent the other of said surfaces and thus elevated relative to the associated cutting tooth end of said one tooth link and all of the other chain section portion supported from said other of said surfaces whereby said depth gauge will be fully exposed from above and project upwardly through a horizontal plane below which all other portions of said chain section are disposed and with which said griding wheel may be engaged from above, said support including mounting means mounting said support on said mount portion for limited angular displacement about an axis disposed generally normal to a plane containing said coextensive grooves.

2. The combination of claim 1 wherein said support includes abutment means supported therefrom for engaging successive teeth of said chain section and limiting shifting of the latter, and thus successive teeth, in one direction through said grooves.

3. The combination of claim 2 wherein said abutment means includes adjustment means operative to variably adjust the positions in which shifting of said chain section in one direction along said groove are limited.

* * * * *